United States Patent
Ito

(10) Patent No.: US 8,197,314 B2
(45) Date of Patent: Jun. 12, 2012

(54) GAME APPARATUS, GAME CONTROL METHOD, GAME CONTROL PROGRAM, AND RECORDING MEDIUM FOR RECORDING THE SAME

(75) Inventor: Yoshinori Ito, Kyoto (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 842 days.

(21) Appl. No.: 12/175,811

(22) Filed: Jul. 18, 2008

(65) Prior Publication Data

US 2009/0029753 A1    Jan. 29, 2009

(30) Foreign Application Priority Data

Jul. 27, 2007   (JP) .................. 2007-196069

(51) Int. Cl.
- *A63F 9/24* (2006.01)
- *A63F 13/00* (2006.01)
- *G06F 17/00* (2006.01)
- *G06F 19/00* (2011.01)

(52) U.S. Cl. .............. 463/4; 463/8; 463/2; 463/37

(58) Field of Classification Search ................. 463/8, 4
See application file for complete search history.

(56) References Cited

U.S. PATENT DOCUMENTS

| | | | | |
|---|---|---|---|---|
| 6,120,374 A | * | 9/2000 | Akada et al. ............... | 463/3 |
| 2001/0027130 A1 | * | 10/2001 | Namba et al. ............... | 463/42 |
| 2003/0022707 A1 | * | 1/2003 | Namba et al. ............... | 463/3 |
| 2007/0213127 A1 | * | 9/2007 | Sato ............................ | 463/36 |

FOREIGN PATENT DOCUMENTS

JP    3822222 B1    6/2006

* cited by examiner

*Primary Examiner* — Melba Bumgarner
*Assistant Examiner* — Syvila Weatherford
(74) *Attorney, Agent, or Firm* — Global IP Counselors, LLP

(57) ABSTRACT

A batter control unit controls a batter to start a preparation swing at the timing at which an input of a first operation information is detected by an operation determination unit after a pitching movement is started, and controls the batter to start a batting swing at the timing at which an input of a second operation information is detected by the operation determination unit. A ball control unit changes the movement result of a ball by batting, according to the period from the starting timing of the pitching movement until the starting timing of the preparation swing, and the starting timing of the batting swing.

11 Claims, 8 Drawing Sheets

GAME APPARATUS, GAME CONTROL METHOD, GAME CONTROL PROGRAM, AND RECORDING MEDIUM FOR RECORDING THE SAME

CROSS-REFERENCE TO THE RELATED APPLICATIONS

This application claims priority to Japanese Patent Application No. 2007-196069. The entire disclosure of Japanese Patent Application No. 2007-196069 is hereby incorporated herein by reference.

BACKGROUND OF THE INVENTION

1. Field of the Invention

The present invention relates to a game apparatus for executing a game, for example, a baseball game and the like, that is performed by altering the display state of an operation object, which is the object that a player intends to manipulate, that is displayed on a displaying device, based on an operation information from an operation input device for receiving an operation input from a player.

2. Description of the Related Art

Game apparatuses, which various games are processed by computers, have been available. Examples of this kind of a game apparatus include an arcade game apparatus used in a shop referred to as a game center and the like that charge for games, a home game apparatus used by being connected to a TV and the like at home, and a portable game apparatus including a displaying device, an operation controller, and a control unit.

Various kinds of this type of games have been provided. A sports game, such as a baseball game, which is one of this type of games, has become quite popular. In the game, characters displayed on a monitor are moved, and a sports tournament is carried out. With this kind of a baseball game, the game could be a player operation type of game, which a player being the game player manipulates player characters on his or her own team and competes to score against the other team. The game could be a director type of game, which a player enjoys being a director of a game that is carried out mainly automatically, and so forth.

In the case that the game is the above described player operation type of game, and if the player is on the offense side, the player advances the game by inputting instructions on the movements of the batter character. This type of a conventional baseball game is disclosed, for example, in Japanese Patent No. 3822222 (Published in Sep. 13, 2006).

In a conventional baseball game, when a player controls the batter, the timing for swinging the bat at a ball being thrown is determined by the timing when the player operates a predetermined button or lever. That is, the player controls the very moment the ball hits the bat.

With the above described kind of a conventional baseball game, with regard to the control of the batter, the adjustment on the strength of hitting back the ball is determined basically only by the timing at which the ball hits the bat. Consequently, it is difficult to control the amount of strength with which the ball is hit back, and the feeling of operating the batting, such as the feeling of hitting a ball that did not go far, the feeling of letting a ball come closely nearby before hitting the ball, the feeling of hitting an extra base hit, and the like, was not able to be provided to the player.

SUMMARY OF INVENTION

In view of the above described problem, the present invention has an object of providing a game apparatus, a game control method, a game control program, and a recording medium in which the game control program is recorded, with which the control of the movements of the operation object can be more entertaining, in a game apparatus for executing a game in which the moving state of the mobile object changes according to the movement of the operation object, which is the object that the player operates.

In order to achieve the above described object, the game apparatus according to the present invention is a game apparatus for executing a game that is performed by altering the display state of an operation object, which is the object that a player manipulates, that is displayed on a displaying device, based on an operation information from an operation input device for receiving an operation input from a player. The game apparatus includes an operation object control unit for controlling the display of the operation object, a mobile object control unit for controlling the display of the mobile object with the moving state thereof changed according to the movement of the operation object, and an operation determination unit for determining the contents of an operation information sent from the operation input device. The game apparatus is configured as follows. The operation object control unit controls the operation object to start a preparation movement of a movement with respect to the mobile object at the timing at which the input of a first operation information is detected by the operation determination unit, after a predetermined moving movement of the mobile object is started, and controls the operation object to start a real movement with respect to the mobile object at the timing at which an input of a second operation information is detected by the operation determination unit. The mobile object control unit changes the movement result of the mobile object as a result of the real movement of the operation object in accordance with the period from the starting timing of a predetermined moving movement of the mobile object until the starting timing of the preparation movement of the operation object, and the period from the starting timing of the preparation movement of the operation object until the starting timing of the real movement.

In addition, the movement result not only includes the spot or the dropped spot that the mobile object reaches at last, but also includes changes of the moving state to that point. For example, as an example of the movement result, in the case of a baseball game, after the ball, which is the mobile object, is hit by the batter, which is the operation object, it is possible to show the differences of the following situations, of the case that it is a home run, the case that it is a hit, the case that it is caught by a fielder, in addition, the case that the timing of the batter is off and it is a strikeout and is caught in the mitt of the catcher, and also, whether or not the ball has the momentum so that it flies into the audience seats by a liner in the case of home runs, and whether or not the ball flies up high and draws an arc diving into the audience seats, as the movement result.

In addition, the game control method according to the present invention is a game control method for executing a game in which an operation object, which is the object that the player operates, is displayed on a displaying device, and the displaying state of the operation object is changed based on operation information from an operation input device for receiving an operation input from the player. The game control method includes an operation object control process for controlling the display of the operation object, a mobile object control process for controlling the display of a mobile object, which the moving state thereof is changed in accordance with the movement of the operation object, and an operation determination process for determining the contents of an operation information sent from the operation input device. In the operation object control process, after a predetermined moving movement of the mobile object is started, a preparation movement of a movement with respect to the mobile object is started by the operation object at the timing at which the input of a first operation information is detected by the operation determination process, and a real movement with respect to the mobile object is started by the operation object at the timing at which the input of a second operation information is detected by the operation determination process. In the mobile object control process, the movement result of the mobile object as a result of the real movement of the operation object is changed, in accordance with the period from the starting timing of a predetermined moving movement of the mobile object until the starting timing of the preparation movement and the period from the starting timing of the preparation movement of the operation object until the starting timing of the real movement.

According to the above described configuration or method, regarding the movement of the operation object, the player can start the preparation movement by performing an operation of creating a first operation information, and can start the real movement by performing an operation of creating a second operation information. Consequently, since it is possible to control more in detail the movement of the operation object, the entertaining degree of the operation can be improved.

In addition, since the movement result of the mobile object by the real movement changes according to the period from the starting timing of a predetermined moving movement of the mobile object until the starting timing of the preparation movement and the period from the starting timing of the preparation movement until the starting timing of the real movement, it becomes necessary for the player to also consider the starting timing of the preparation movement and the preparation movement period. That is, by controlling the preparation movement, the movement result of the mobile object can be controlled to be in a desired state, and the entertaining degree of the game can be improved.

Furthermore, in the above described configuration, the game apparatus according to the present invention further includes an evaluation information memory unit for storing an evaluation standard information showing the relationship between an evaluation result and the period from the starting timing of a predetermined moving movement of the mobile object until the starting timing of the preparation movement of the operation object and the period from the starting timing of the preparation movement of the operation object until the starting timing of the real movement, and a player operation evaluation unit for specifying an evaluation result information as the evaluation result of the operation by the player, according to the evaluation standard information. The configuration of the mobile object control unit may be to determine the movement result of the mobile object based on the evaluation result information specified by the player operation evaluation unit.

According to the above described configuration, the evaluation of the operation by the player is performed based on the evaluation standard information that shows the relationship between the evaluation result and the period from the starting timing of a predetermined moving movement of the mobile object until the starting timing of the preparation movement and the period from the starting timing of the preparation movement until the starting timing of the real movement, and the movement result of the mobile object is determined based on the evaluation result related to the starting timing of the two movements of the preparation movement and the real movement. Consequently, the movement result of the mobile object can be specified precisely to be closer to the reality, compared to the conventional way of determining the movement result of the mobile object from only the timing of one movement.

In addition, in the above described configuration, the configuration of the game apparatus according to the present invention may be as follows. The evaluation standard information includes a preparation movement evaluation standard information that shows the relationship between a preparation movement evaluation value and the period from the starting timing of a predetermined moving movement of the mobile object until the starting timing of the preparation movement of the operation object, and a real movement evaluation standard information that shows the relationship between a real movement evaluation value and the period from the starting timing of the preparation movement of the operation object until the starting timing of the real movement. The player operation evaluation unit specifies the preparation movement evaluation value and the real movement evaluation value according to the evaluation standard information, and calculates an operation evaluation value based on the preparation movement evaluation value and the real movement evaluation value, and the mobile object control unit determines the movement result of the mobile object base on the operation evaluation value calculated by the player operation evaluation unit.

According to the above described configuration, since the operation evaluation value is calculated by the form of the preparation movement evaluation value and the real movement evaluation value, the movement result of the mobile object can be specified precisely to be closer to the reality.

In addition, the configuration of the game apparatus according to the present invention may be as follows. In the above described configuration, at least one of either the preparation movement evaluation value set in the preparation movement evaluation standard information, or the real movement evaluation value set in the real movement evaluation standard information is formed from a plurality of evaluation values predetermined to correspond to each period of time passed from the starting timing of the respective movement.

According to the above described configuration, since the evaluation value of the preparation movement evaluation value or the real movement evaluation value is formed from a plurality of evaluation values predetermined to correspond to the period of time passed from the starting timing of the respective movement, each evaluation value can be obtained unambiguously and easily by only managing the time of the preparation movement or the real movement, and can contribute to the simple calculation of the operation evaluation value.

In addition, the configuration of the game apparatus according to the present invention may be as follows. In the above described configuration, the evaluation values are set so that the highest value is set at the timing of a first passed time from the starting timing of the movement, in each of the preparation movement and the real movement, and set with a point distribution such that the values lower gradually, the farther away temporally from the timing of the first passed time.

According to the above described configuration, the point that is the most favorable timing of the movement of the player is set as the timing of the first passed time from the starting timing of the movement, and the values gradually decrease, the farther they are away temporally from that timing. In other words, since the farther the movement timing is off from the most favorable point, the evaluation values decrease, the player will be able to feel his or her own operational skill being reflected naturally, same as the timing in an actual game, and thus, a sense of realism can be reproduced truly in the game.

In addition, the configuration of the game apparatus according to the present invention may be as follows. In the above described configuration, the player operation evaluation unit calculates the operation evaluation value by adding the preparation movement evaluation value and the real movement evaluation value.

According to the above described configuration, since the operation evaluation value can be calculated by a comparatively simple information process of adding the preparation movement evaluation value and the real movement evaluation value, the time necessary for the calculation process can be reduced. Consequently, a high speed game progress can also be handled without delay.

In addition, the configuration of the game apparatus according to the present invention may be as follows. In the above described configuration, evaluation values set on or after the timing of a second passed time that is temporally after the timing of the first passed time in the respective evaluation values are set as invalid evaluation values. The player operation evaluation unit sets the operation evaluation value to the lowest value, if at least one of either the preparation movement evaluation value or the real movement evaluation value specified is the invalid evaluation value.

According to the above described configuration, in the case that the start of the movement of at least either the preparation movement or the real movement is overly delayed, even if supposedly the start of the other movement is at the best point, the operation evaluation value will become the lowest value. For example, in a baseball game, in the case that the timing of the drawing of the bat in the preparation swing is overly delayed, even if the bat is swung at an excellent timing at the batting swing, since the drawing movement itself is delayed, the timing does not match the ball and will become a missed swing. Therefore, in this configuration, it is necessary for a player to operate while paying attention to both the timing of the preparation movement and the real movement, and for example, since the play has the realism like the batting in an actual baseball game, the degree of the game playing can be high.

In addition, the configuration of the game apparatus according to the present invention may be as follows. In the above described configuration, an operation object capability memory unit for storing the capability information related to the operation object is included, and the player operation evaluation unit changes the operation result information according to the capability information stored in the operation object capability memory unit.

According to the above described configuration, the movement result of the mobile object changes according to the capability information set in the operation object. Consequently, the game can be rendered so that the result changes according to the character setting of the operation object, and the like.

In addition, the configuration of the game apparatus according to the present invention may be as follows. In the above described configuration, the mobile object control unit has a function for changing the moving state of the mobile object in the predetermined moving movement into each of the predetermined moving movements, and the player operation evaluation unit changes the evaluation result information in accordance with the moving state of the mobile object.

According to the above described configuration, the movement result of the mobile object changes according to the moving state of the mobile object in the predetermined moving movement. Consequently, the game can be rendered so that the result changes according to the moving state of the mobile object.

In addition, the configuration of the game apparatus according to the present invention may be as follows. In the above described configuration, a movement object control unit for controlling the display of a movement object that performs a movement for starting a predetermined moving movement of the mobile object, and a movement object capability memory unit for storing capability information related to the movement object are further included. The player operation evaluation unit changes the evaluation result information in accordance with the capability information stored in the movement object capability memory unit.

According to the above described configuration, since the predetermined moving movement of the mobile object is started by a movement of the movement object, the player can recognize the start of the movement of the mobile object by the movement of the movement object. Consequently, it is possible to provide a realistic competitive type of game, in which the movement of the operation object is controlled by looking at the movement of the movement object.

In addition, the movement result of the mobile object changes according to the capability information set for the movement object. Consequently, the game can be rendered so that the result changes according to the character setting of the movement object, and the like.

In addition, the configuration of the game apparatus according to the present invention may be as follows. In the above described configuration, the operation determination unit determines a plurality of types of operation information as the second operation information, and along with this, the operation object control unit changes the type of the real movement with respect to the mobile object by the operation object, in accordance with the type of operation information determined as the second operation information by the operation determination unit, and the player operation evaluation unit changes the evaluation result information in accordance with the type of the real movement.

According to the above described configuration, the player can change the contents of the real movement by changing the operation of the instruction for starting the real movement. That is, after the preparation movement is started, since the contents of the real movement can be changed according to the situation thereafter, a highly real-time, and a wide variety of operational options can be provided.

In addition, the movement result of the mobile object changes according to the capability value set for the movement object. Consequently, the game can be rendered so that the result changes according to the character setting of the movement object, and the like.

In addition, the configuration of the game apparatus according to the present invention may be as follows. In the above described configuration, after a predetermined moving movement of the mobile object is started, and when an operation information showing that a predetermined operation button has been pressed down is received in the operation input device, the operation determination unit determines the operation information as the input of the first operation information, and after the first operation information is inputted and when an operation information showing that the operation button has been pressed down again is received, the operation determination unit determines the operation information as the input of the second operation information.

According to the above described configuration, the player can perform the starting instruction of the preparation movement and the starting instruction of the real movement by pressing the same operation button twice, without performing an operation that is not straightforward, such as having to move a finger to a different button.

In addition, since the operation of pressing down the operation button is a movement in which, for the player, the timing can be easily grasped, the starting instruction of the preparation movement and the real movement can be performed precisely at a timing that is intended by the player.

In addition, for example, an operation control that starts the preparation movement at the timing when a specific operation button is pressed down, and starts the real movement at the timing when the pressing down of the operation button is cancelled is possible, but in this case, there is the problem that it will be difficult to perform an operation in which the real movement is not performed after the preparation movement is started. With respect to this, according to the above described configuration, this can be done easily by not pressing down the operation button the second time.

In addition, the above described game apparatus may be realized by a computer, and in this case, a game control program of the game apparatus for realizing the game apparatus via the computer by having the computer operate as each of the unit, and also the recording medium readable by the computer in which the game control program is recorded fall into the category of the present invention.

As described above, the configuration of the game apparatus according to the present invention is as follows. The operation object control unit controls the operation object to start a preparation movement of a movement with respect to the mobile object at the timing at which the input of a first operation information is detected by the operation determination unit after a predetermined moving movement of the mobile object is started, and controls the operation object to start the real movement with respect to the mobile object at the timing at which the input of a second operation information is detected by the operation determination unit. The mobile object control unit changes the movement result of the mobile object by the real movement of the operation object according to the period from the starting timing of a predetermined moving movement of the mobile object until the starting timing of the preparation movement of the operation object and the period from the starting timing of the preparation movement of the operation object until the starting timing of the real movement. By doing so, since the movement of the operation object is controlled more in detail, and the realism of the actual world can be reflected in the game, operating the game can be more entertaining.

BRIEF DESCRIPTION OF THE DRAWINGS

Referring now to the attached drawings which form a part of this original disclosure:

FIG. 6A shows an example of an evaluation table for the preparation swing, and 6B shows an example of an evaluation table for the batting swing;

FIG. 7A shows another example of an evaluation table for the preparation swing, and 7B shows another example of an evaluation table for the batting swing;

DETAILED DESCRIPTION OF THE PREFERRED EMBODIMENTS

Figure 2:
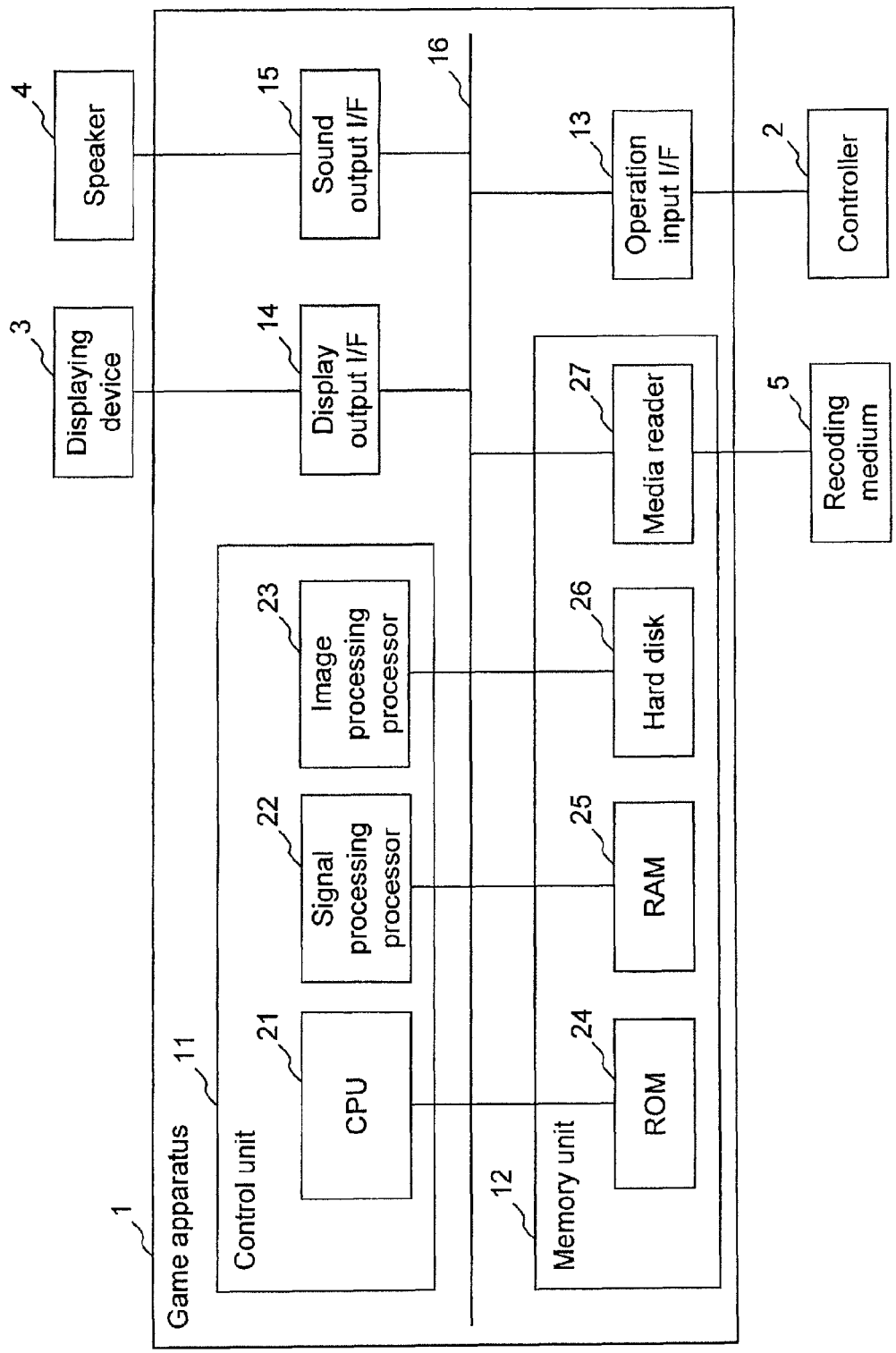
FIG. 2 is a block diagram showing a schematic configuration of the game system.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents Configuration of the Game System FIG. 2 is a block diagram showing the schematic configuration of a game system 10 according to this embodiment. As shown in the same figure, the game system 10 includes a game apparatus 1, a controller 2, a displaying device 3, a speaker 4, and a recording medium 5.

The game apparatus 1 is an apparatus that performs information processing of the games provided by the game system 10, and the control of external devices such as the displaying device 3 and the speaker 4. The controller (operation input device) 2 is a device for receiving an operation instruction input with respect to game apparatus 1 from a player, as the game player, and on which various buttons and operation levers and the like are provided. In addition, in the figure, even though only one controller 2 is shown, a plurality of controllers 2 may be connected to the game apparatus 1.

The displaying device 3 displays a game executed by the game apparatus 1. This displaying device 3, although it can be any displaying device able to display an image, can be, for example, made up of a liquid crystal display panel, an EL (Electro Luminescence) display panel, a CRT (Cathode Ray Tube) displaying device, and the like. The speaker 4 is a device for outputting a sound used in a game executed by the game apparatus 1. The recording medium 5 corresponds to, for example, a ROM (Read Only Memory) cassette, a card type memory, an optical disk, a flexible disk, and the like, and stores game programs and game data, and the like. In addition, in the case that the recording medium 5 is a writable recording medium, various game parameters may be recorded in the case that a game is interrupted.

In addition, in this embodiment, a home game apparatus is supposed as an example of the game apparatus 1. In this case, the displaying device 3 and the speaker 4 correspond to a television system at home. However, the game system including the game apparatus according to the present invention is not limited to the game system that includes the home game apparatus, and can also be realized by an arcade game apparatus used in a shop that provides and charges for games, a portable game apparatus that includes a displaying device, an operation controller, and a control unit, and the like.

The game apparatus 1 includes a control unit 11, a memory unit 12, an operation input I/F 13, a display output I/F 14, and a sound output I/F 15. Each of these members is connected via the bus 16. This bus 16 includes an address bus, a data bus, a control bus, and the like.

The control unit 11 mainly controls the overall progress of a game based on a game program. This control unit 11 includes a CPU (Central Processing Unit) 21, a signal processing processor 22, and an image processing processor 23. The CPU 21, signal processing processor 22, and the image processing processor 23 are connected to each other via the bus 16, respectively.

The CPU 21 interprets a command from a game program, and controls various data processes. For example, the CPU 21 instructs the signal processing processor 22 to provide an image data to the image processing processor. The signal processing processor 22 mainly performs calculation in a three dimensional space, positional conversion calculation from a three dimensional space to a virtual reality three dimensional space, light source calculation process, and image and sound data generation processing.

Here, the image data will be described. Image data for displaying an object that moves in a three dimensional space may be expressed by polygon data and texture data. Polygon data refers to an apical coordinate data that forms a polygon. Texture data is data for setting a texture to the polygon, and includes texture instruction data and texture color data. Texture instruction data is data for relating the polygon with the texture, and the texture color data is data for specifying the color of the texture. Polygon address data and texture address data that show the memory position of each data are related to the polygon data and the texture data.

In the case that this kind of image data is used, the signal processing processor 22 performs coordinate conversion and perspective projection conversion on the polygon data (three dimensional polygon data) in the three dimensional space shown by the polygon address data, based on the movement amount data and the rotation amount data of the window itself (viewpoint), and displaces the polygon data in three dimensional space into polygon data in a two dimensional space (two dimensional polygon data). Then, the external form of the polygon is formed by a plurality of two dimensional polygon data, and in the interior region of the polygon, the texture data shown by the texture address data is displayed. By doing so, objects with texture attached to each polygon, in other words, various characters are depicted.

The image processing processor 23 mainly performs a writing process of image data that should be drawn to the RAM 25, to be described later, based on the calculation result and the processing result of the signal processing processor 22.

The memory unit 12 includes a ROM (Read Only Memory) 24, a RAM (Random Access Memory) 25, a hard disk 26, and a media reader 27. The ROM 24 stores the minimum necessary data for operating the game apparatus 1, such as, for example, program data of BIOS (basic input output system), program data of OS (operating system), and the like. RAM 25 functions as a working memory when the information processing is performed by the control unit 11. The hard disk 26 stores various setting data, game program data, setting data and point data corresponding to each game, and the like. The media reader 27 reads information out of the recording medium 5. In addition, in the case that the recording medium 5 is a writable medium, the media reader 27 may further include a function as a media writer for performing a writing process of information.

In addition, the ROM 24, hard disk 26, and the media reader 27 are not all necessary constituents, as long as necessary information is being recorded in one of any of the recording media. That is, as the recording medium included in the memory unit 12 and the recording medium 5 from where the media reader reads, for example, tape type of a magnetic tape or a cassette tape and the like, disk type including optical disks such as CD-ROM, MO, MD, DVD, CD-R, and magnetic disks such as a floppy (registered trademark) disk, hard disk, card type such as IC card (including memory card), optical cards and the like, or semiconductor memory type such as Mask ROM, EPROM, EEPROM, Flash ROM, and the like, and so forth, can be used.

In addition, the above program code may be supplied via a communication network, with a configuration that the game apparatus 1 is able to connect to the communication network. This communication network is not limited to a specific communication network, and for example, internet, intranet, extra net, LAN, ISDN, VAN, CATV communication network, virtual private network (virtual private network), telephone network, mobile communication network, satellite communication network, and the like can be used. In addition, the transmission medium that forms the communication network is not limited to a specific transmission medium, and for example, IEEE1394, USB, power-line carrier, cable TV line, telephone line, ADSL line, and any other wired configuration, or infrared ray like IrDA or remote control, Bluetooth (registered trademark), 802.11 wireless, HDR, cellular phone network, satellite connection, terrestrial digital network, and any other wireless configuration can be used. In addition, the present invention is realized by the electronic transmission of the above program code, and can also be realized with a configuration of a computer data signal embedded in a carrier wave.

The operation input I/F 13 performs a process of receiving an operation instruction signal (operation information) sent out from the controller 2, and transmits the signal to the control unit 11 via the bus 16. The controller 2 and the operation input I/F 13 may be connected through a wired connection or may be connected wirelessly.

The display output I/F 14 performs a process of outputting an image signal processed by the image processing processor 23 according to the progress of the game and outputted from the control unit 11 to the displaying device 3. The sound output I/F 15 performs a process of outputting a sound signal outputted from the control unit 11 according to the progress of the game to the speaker 4.

Functional Configuration of the Control Unit and the Memory Unit

Next, the functional configuration of the control unit 11 and the memory unit 12 will be described below while referring to FIG. 3.

First, in this embodiment, the game provided by the game system 10 is supposed to be a baseball game of the player operation type of game in which a player, being the game player, competes to score against the other team by operating the player characters on his or her own team. In the case of this kind of a baseball game, one player may play against the computer as the rival in a one player mode, or two players may play against each other in a two player mode. In this embodiment, the progress of the game is supposed based on a one player mode game, but can also be applied to a two player mode game.

In this baseball game, a player basically performs an instruction input on the batting of the batter when the player is on the offense side, and performs instruction input on the pitching of the pitcher when the player is on the defense side. Furthermore, the configuration may be to have the player input a running instruction of a runner on base when the player is on the offense side, or input a movement instruction of a fielder other than the pitcher when the player is on the defense side, and so forth.

The progress of a game on the batting of the batter, when the player is on the offense side will be described below. In this case, the batter corresponds to the operation object that the player manipulates. In addition, the ball corresponds to the mobile object in which the moving state thereof is being altered according to the batting movement of the batter, as the operation object. In addition, the pitcher corresponds to the movement object that performs the movement of starting a predetermined moving movement of the ball, which is the mobile object, that is, the moving movement of the ball from the pitcher towards the batter.

Figure 3:
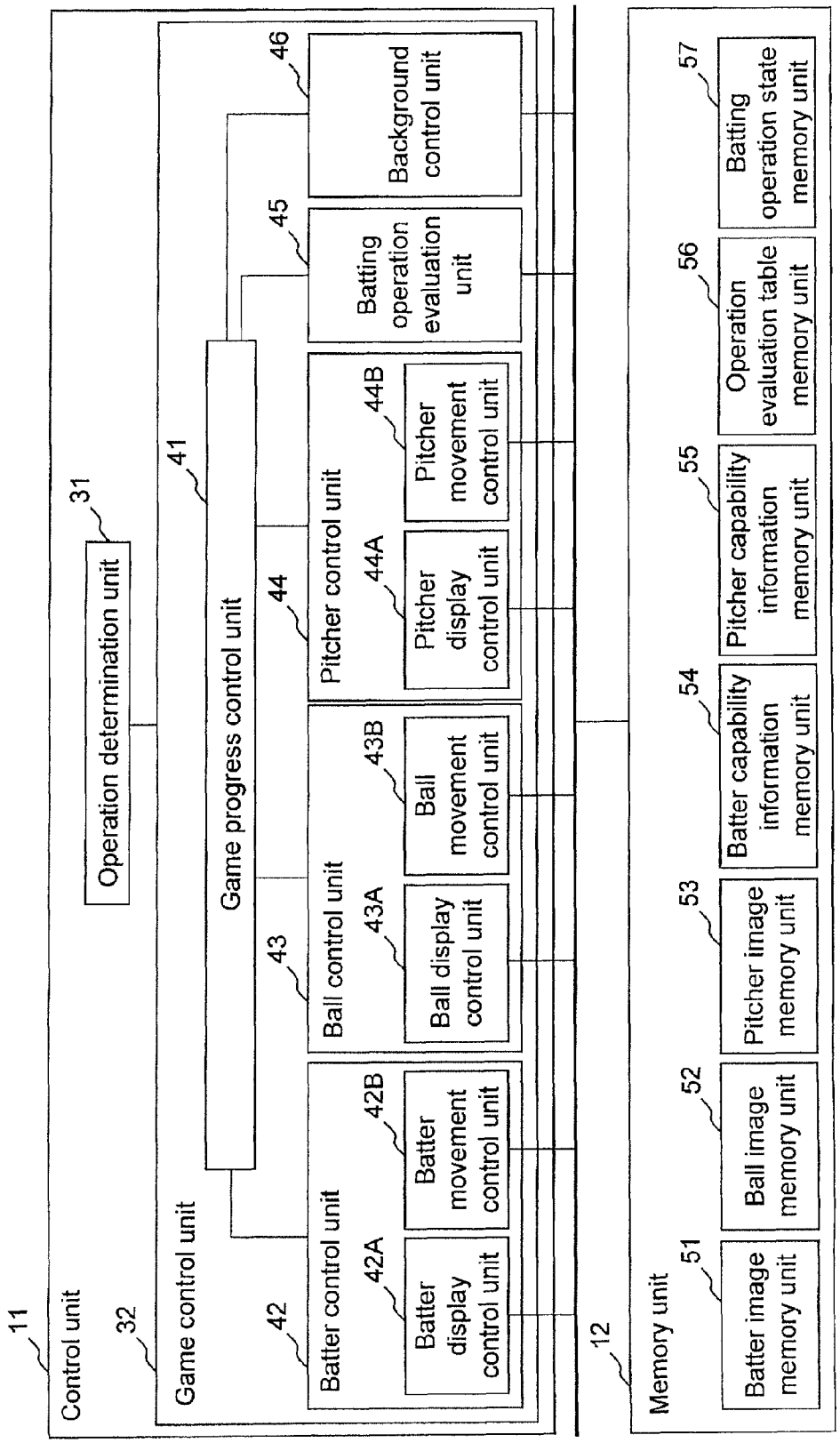
FIG. 3 is a block diagram showing the functional configuration of a control unit and a memory unit included in the game apparatus in the game system.

As shown in FIG. 3, the control unit 11 includes an operation determination unit (operation determination unit) 31 and a game control unit 32 as functional blocks. In addition, each functional block shown below included in the control unit 11 is realized by a process performed according to a program by at least one of any of the above described CPU 21, signal processing processor 22, and the image processing processor 23. That is, each can be achieved through providing a recording medium in which a program code (executable format program, intermediate code program, source program) of the control program of the game apparatus 1, which is a software for realizing each functional block, is recorded to be machine-readable, to the above described game apparatus 1, and have the program code recorded in the recording medium read out and executed by the computer (or CPU, MPU). In addition, each functional block may be formed by hardware logic.

The operation determination unit 31 performs a process of determining the contents of an operation instruction signal sent out from the controller 2 and received by the operation input I/F 13. The information that shows the contents of the operation instruction signal determined here is sent to the game control unit 32.

The game control unit 32 is a block for controlling the action of the game provided by the game system 10, and includes a game progress control unit 41, a batter control unit (operation object control unit) 42, a ball control unit (mobile object control unit) 43, a pitcher control unit (movement object control unit) 44, a batting operation evaluation unit (player operation evaluation unit) 45, and a background control unit 46.

The game progress control unit 41 is a block for controlling the overall progress of the game according to the program of the baseball game. The batter control unit 42, the ball control unit 43, the pitcher control unit 44, the batting operation evaluation unit 45, and the background control unit 46 shown below are executed appropriately through the game progress control by this game progress control unit 41.

The batter control unit 42 is a block for controlling the movement and display of the batter. This batter control unit 42 includes a batter display control unit 42A and a batter movement control unit 42B.

The batter movement control unit 42B controls the batter movement according to the operation input by the player. More specifically, if it is determined by the operation determination unit 31 that the operation instruction signal that shows the movement instruction of the batter is inputted, the batter movement control unit 42B controls the movement of the batter according to the contents of the operation instruction signal. In addition, the batter movement control unit 42B stores the contents and the input timing of the operation instruction signal that shows the movement instruction of the batter in a batting operation state memory unit 57 in the memory unit 12 as the batting operation information, with every batting movement.

The batter display control unit 42A performs the control of the display of the movement of the batter, according to the batter movement control by the batter movement control unit 42B. More specifically, the batter display control unit 42A reads out the image data stored in the batter image memory unit 51 of the memory unit 12, and performs an image calculation process so that the image is in accordance with the batter movement control by the batter movement control unit 42B. Then, the batter display control unit 42A outputs the image data of the image calculation process result to the displaying device 3 via the display output I/F 14.

In addition, in reality, the image data outputted from the batter display control unit 42A, the ball display control unit 43A, the pitcher display control unit 44A, and the background control unit 46 are put together, each as a layer, and an image data that shows one display image plane is generated inside the control unit 11 and outputted to the displaying device 3 via the display output I/F 14.

The pitcher control unit 44 is a block for controlling the movement and display of the pitcher. This pitcher control unit 44 includes a pitcher display control unit 44A, and a pitcher movement control unit 44B.

The pitcher movement control unit 44B controls the pitcher movement according to the program. That is, when the mode is in the one player mode, since the competing rival is the computer, in the case that the player is on the offense side, the movement of the pitcher is controlled by the program. In addition, when the mode is in the two player mode, if the operation determination unit 31 determines that an operation instruction signal showing a movement instruction of the pitcher is inputted, the pitcher movement control unit 44B controls the movement of the pitcher according to the contents of the operation instruction signal. In addition, the pitcher movement control unit 44B stores the start of the timing of the pitching movement in the batting operation state memory unit 57 in the memory unit 12 as the pitching movement information, with every pitching movement.

The pitcher display control unit 44A controls the display of the movement of the pitcher, according to the pitcher movement control by the pitcher movement control unit 44B. More specifically, the pitcher display control unit 44A reads out the image data stored in a pitcher image memory unit 53 of the memory unit 12, and performs an image calculation process so that the image is in accordance with the pitcher movement control by the pitcher movement control unit 44B. Then, the pitcher display control unit 44A outputs the image data of the image calculation process result to the displaying device 3 via the display output I/F 14.

The ball control unit 43 is a block for controlling the movement and display of the ball. This ball control unit 43 includes a ball display control unit 43A and a ball movement control unit 43B.

The ball movement control unit 43B controls the moving movement of the ball according to pitching movement of the pitcher and the batting movement by the batter. More specifically, the ball movement control unit 43B controls the pitching moving movement of the ball according to the pitching movement contents of the pitcher, if the pitching movement is started by the pitcher movement control unit 44B. In addition, if the batting movement is performed by the batter movement control unit 42B, the batted ball moving movement of the ball is controlled according to the batting movement of the batter and the batting operation evaluation result by the batting operation evaluation unit 45, to be described later.

The ball display control unit 43A controls the display of the movement of the ball according to the ball movement control by the ball movement control unit 43B. More specifically, the ball display control unit 43A reads out the image data stored in the ball image memory unit 52 of the memory unit 12, and performs an image calculation process so that the image is in accordance with the ball movement control by the ball movement control unit 43B. Then, the ball display control unit 43A outputs the image data of the image calculation process result to the displaying device 3 via the display output I/F 14.

The batting operation evaluation unit 45 performs the evaluation process of the batting operation according to the timing and the contents of the operation instruction input with respect to the batter movement by the player, with every batting movement. More specifically, the batting operation evaluation unit 45 reads out the pitching movement information and the batting operation information stored in the batting operation state memory unit 57, and evaluates the batting operation shown in the batting operation information according to an operation evaluation table stored in an operation evaluation table memory unit (evaluation information memory unit) 56. In this case, the batting operation evaluation unit 45 reads out the batter capability information of the batter stored in the batter capability information memory unit (operation object capability memory unit) 54, and the pitcher capability information of the pitcher stored in the pitcher capability information memory unit (movement object capability memory unit) 55, and evaluates the batting operation considering the batter capability information and also the pitcher capability information. In addition, the batter capability information and the pitcher capability information related to a plurality of players able to appear in the game are stored in the batter capability information memory unit 54 and the pitcher capability information memory unit 55.

The background control unit 46 performs the movement control and display control related to players other than the pitcher and the batter and any other appearing characters, and also performs the display control of the background image along with the progress of the game. Various data necessary for these controls are stored in the memory unit 12, and the background control unit 46 reads out the necessary data appropriately from the memory unit 12 and performs the process.

Flow of the Game Process

Next, the flow of the process of the game provided by the game system 10 will be described. The game executed in this embodiment, as described above, is a baseball game of the player operation type. In this kind of a baseball game, same as the progress of an actual baseball game, a game progresses with two teams alternating between the offense period and the defense period. In the following, when the team of the player is on the offense side, the flow of the batting process when the player performs an instruction input of the batting of the batter with respect to one pitching movement by the pitcher will be described.

Figure 1:
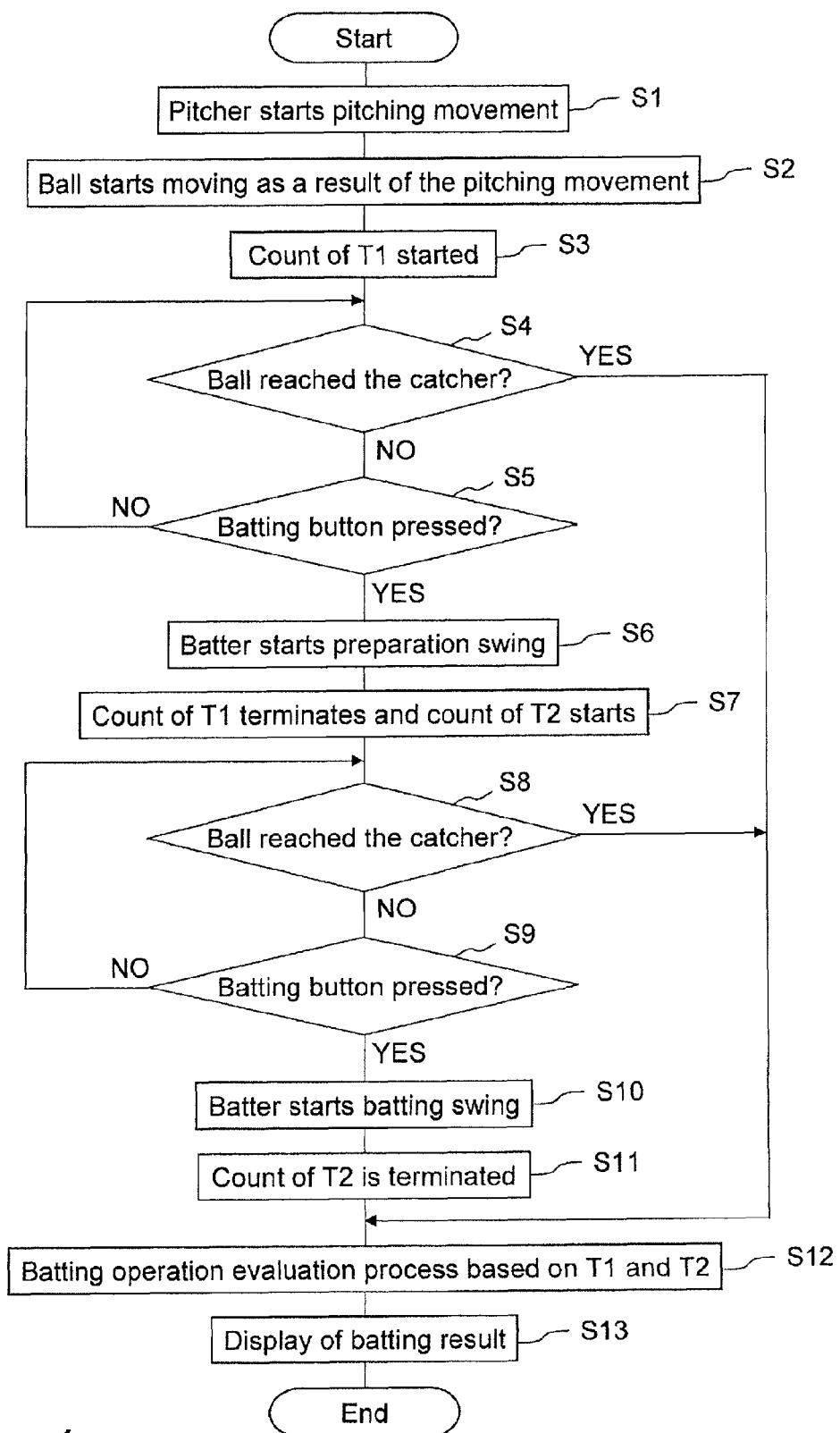
FIG. 1 is a flowchart showing the flow of the processes of a game provided by the game system in accordance with an embodiment of the present invention.

FIG. 1 is a flowchart showing the flow of the above described batting process. First, in Step 1 (hereinafter referred to as S1), the pitcher starts a pitching movement according to the control of the pitcher control unit 44. The starting time of the pitching movement here is the time when the pitching motion, for a pitcher to pitch, is started. And, along with the start of this pitching movement, the moving of the ball is started according to the control of the ball control unit 43 (S2). In addition, the ball is held by the pitcher in the period from the time immediately after the start of the pitching movement until the pitcher releases the ball from his hand, but even in this period, the ball is supposed to be moving according to the pitching motion of the pitcher.

In other words, the starting timing to start the moving movement of the ball as the mobile object as a result of the pitching, as the predetermined moving movement, is the starting time of this pitching movement. From the starting time of this pitching movement, in other words, the movement starting time of the ball, the count of T1 is started (S3). T1 expresses the time from the movement starting time of the ball to the starting time of a preparation swing (to be described later) by the batter.

The start of the count of T1, in this embodiment, is realized by storing a starting timing of the pitching movement by the pitcher movement control unit 44B in the batting operation state memory unit 57 in the memory unit 12 as the pitching movement information. In addition, a timer (timing unit) for performing the count of the T1 is provided in the game control unit 32, and this timer may be configured to start the time measurement at the starting timing of the pitching movement.

Figure 4A:
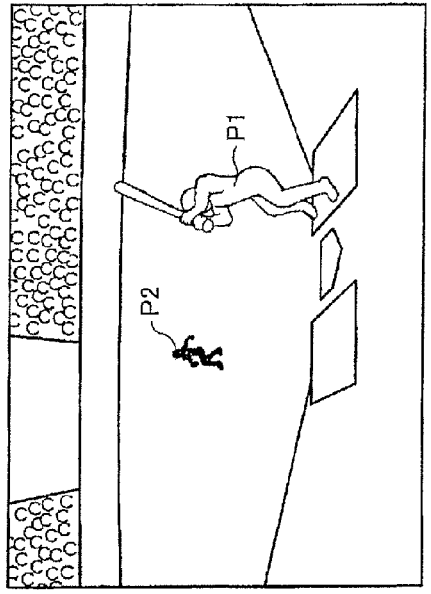
FIGS. 4A to 4D show an example of each of the display screens from the start of the pitching movement of the pitcher until the end of the batting of the batter.

If the pitching movement is started by the pitcher, an image display is controlled along with the pitching movement of the pitcher, by the pitcher display control unit 44A and the ball display control unit 43A. FIG. 4A shows an example of a display screen at the start of the time of the pitching movement by the pitcher. In the same figure, P1 shows the image of the batter, and P2 shows the image of the pitcher.

Next, in S4, the ball movement control unit 43B determines whether or not the ball reached the catcher. This determination is performed as follows. First, according to the pitching movement contents of the pitcher by the pitcher movement control unit 44B, the ball movement control unit 43B confirms the moving state of the ball, such as the speed of the ball, movement pathway, and the like, for instance, and calculates the time T0 from the start of the movement of the ball to the time the ball, in the case that batting is not performed, reaches the catcher. Then, the ball movement control unit 43B determines whether or not the ball has reached the catcher, by determining whether or not the time passed from the time the ball started moving exceeded the time T0.

If YES in S4, that is, if the ball reached the catcher, the batter did not perform the batting movement, and the process moves to S12. On the other hand, if NO in S4, that is, if the ball did not reach the catcher, the batter movement control unit 42B determines whether or not the batting button assigned as the batting instruction button in the controller 2 is pressed in S5. More specifically, the batter movement control unit 42B determines whether or not the information that shows a batting instruction signal (first operation information), which shows the batting button as the operation instruction signal is pressed, is detected, is received from the operation determination unit 31. If NO in S5, that is, if it is determined that the batting button is not pressed, the process from S4 will be repeated.

On the other hand, if YES in S5, that is, if it is determined that the batting button is pressed, the batter movement control unit 42B controls the movement so that the batter starts the preparation swing (S6). Here, the swing of the batter will be described. The movement of the swing of the bat, for performing the batting by the batter, is divided into two movements of a first half and a last half movement. The first half of the swing, that is, the swing as a preparation movement is referred to as the preparation swing, and the last half of the swing, that is, the swing for hitting the ball with the bat as the real movement is referred to as the batting swing.

Figure 4B:
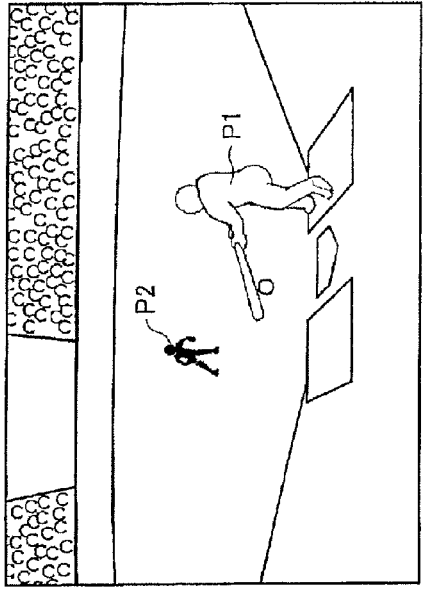

As described above, when the movement control of the preparation swing is performed by the batter movement control unit 42B, the batter display control unit 42A controls the image display of the batter performing the preparation swing. FIG. 4B shows an example of a display screen of the start of the time of the preparation swing by the batter. In this example, the preparation swing by the batter is started at the stage during the middle of the pitching motion by the pitcher.

In addition, if the preparation swing is started by the batter, the count of T2 is started with the count of T1 terminated (S7). T2 expresses the time from the starting time of the preparation swing by the batter until the starting time of the batting swing.

In this embodiment, the termination of the count of T1 and the start of the count of T2 are realized by the batter movement control unit 42B storing the starting timing of the preparation swing in the batting operation state memory unit 57 in the memory unit 12 as the batting movement information. In addition, the timer (timing unit) for performing the count of T2 is provided in the game control unit 32, and this timer may be configured to start the time measurement at the starting timing of the preparation swing.

Next, in S8, the ball movement control unit 43B determines whether or not the ball reached the catcher. This determination is performed the same way as the determination process in S4.

If YES in S8, that is, if the ball reached the catcher, the batter did not perform the batting swing, and the process moves to S12. On the other hand, if NO in S8, that is, if the ball did not reach the catcher, in S9, the batter movement control unit 42B determines whether or not the batting button is pressed in controller 2. More specifically, the batter movement control unit 42B determines whether or not the information that shows the batting instruction signal (second operation information), which shows that the batting button as the operation instruction signal is pressed, is detected, is received from the operation determination unit 31. If NO in S9, that is, if it is determined that the batting button is not pressed, the process from S8 will be repeated.

Figure 4C:
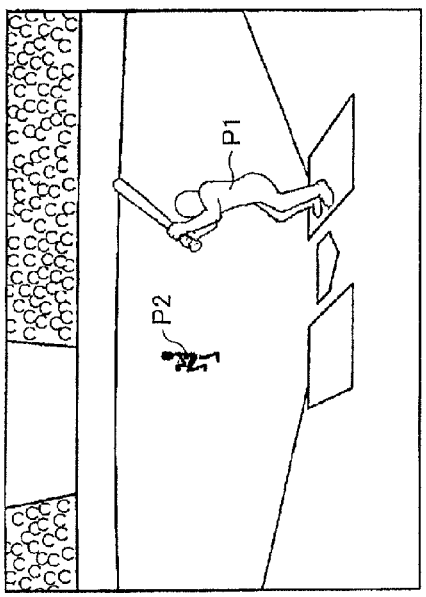

On the other hand, if YES in S9, that is, if it is determined that the batting button is pressed, the batter movement control unit 42B controls the movement so that the batter starts the batting swing (S10). If the movement control of the batting swing is performed by the batter movement control unit 42B, the batter display control unit 42A controls the image display of the batter performing the batting swing. FIG. 4C shows an example of a display screen at the start of the time of the batting swing by the batter. In this example, the batting swing is started by the batter at the stage during the middle of the ball being released from the hand of the pitcher and flying towards the side of the batter.

In addition, if the batting swing is started by the batter, the count of T2 is terminated (S11). In this embodiment, the termination of the count of T2 is realized by the batter movement control unit 42B storing the starting timing of the batting swing in the batting operation state memory unit 57 in the memory unit 12 as the batting movement information.

Next, in S12, the batting operation evaluation unit 45 performs the batting operation evaluation process for evaluating the movement result of the ball as a result of this batting process. More specifically, the batting operation evaluation unit 45 identifies T1 and T2 from the information stored in the batting operation state memory unit 57, and refers to the operation evaluation table stored in the operation evaluation table memory unit 56 to identify the evaluation on the batting as the evaluation result information. In addition, details on the batting operation evaluation process by this batting operation evaluation unit 45 will be described later.

Figure 4D:
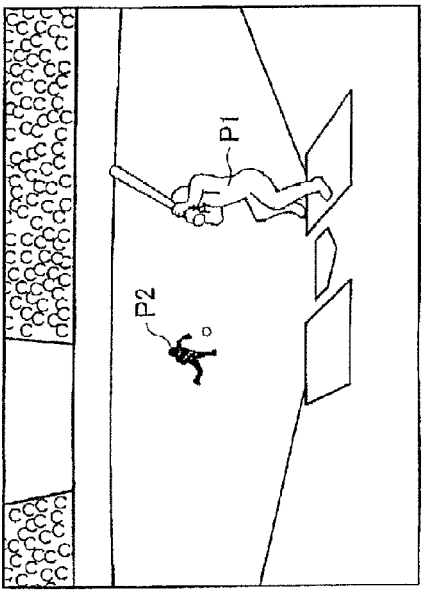

If the batting operation evaluation process is performed, in the following S13, the display of the batting result according to the evaluation result information of the batting operation is performed. First, the ball movement control unit 43B determines the movement contents of the ball by the batting according to the evaluation result information of the batting operation, and in accordance with this, the ball display control unit 43A controls the image display that shows the movement of the ball. In addition, the batter control unit 42, the pitcher control unit 44, and the background control unit 46 also perform movement control and display control of the batter, pitcher, fielder, and the like, according to the batting operation evaluation result. FIG. 4D shows an example of a display screen of the batting result. In this example, an image of the very moment that the ball starts to move when being hit by the batting swing of the batter is shown.

One batting process is completed by the above process. A play is carried out by the player during the offense period by this kind of a batting process performed repeatedly.

Details on the Batting Operation Evaluation Process

Next, details on the batting operation evaluation process described above will be described. In the batting operation evaluation process, first, the batting operation evaluation unit 45 calculates T1 and T2 from the information stored in the batting operation state memory unit 57. More specifically, T1 is calculated according to the time difference between the starting timing of the pitching movement and the starting timing of the preparation swing, from the information stored in the batting operation state memory unit 57. In addition, T2 is calculated according to the time difference between the starting timing of the preparation swing and the starting timing of the batting swing, from the information stored in the batting operation state memory unit 57.

Figure 5:
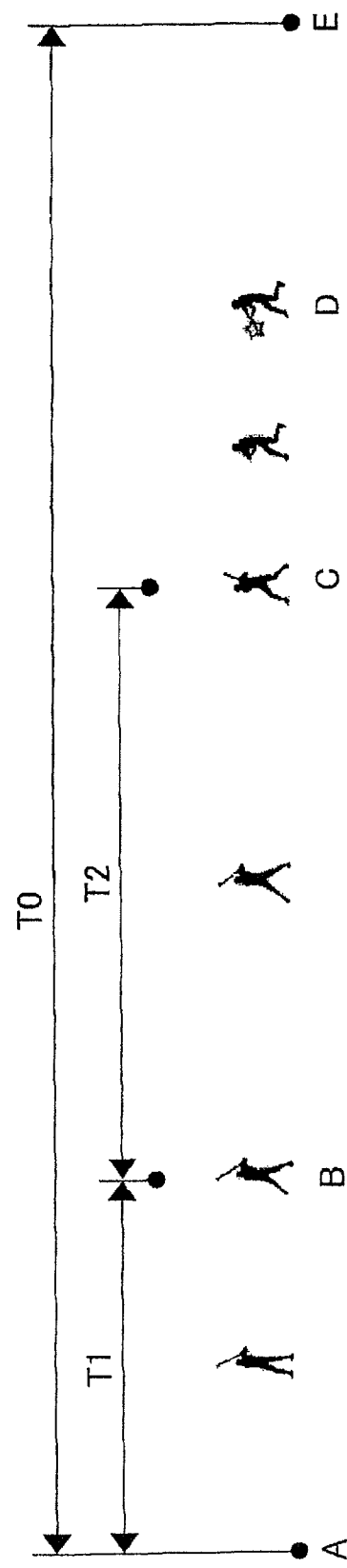
FIG. 5 shows the relationship among the time from the start of the movement of the ball from the starting time of a pitching movement until the scheduled time when the ball reaches the catcher, the time from the starting time of the pitching movement until the starting time of a preparation swing, and the time from the starting time of the preparation swing until the starting time of a batting swing.

FIG. 5 shows the relationship of the time T0 from the start of the movement of the ball as a result of the pitching movement to the scheduled time of the ball reaching the catcher, the time T1 from the starting time of the pitching movement to the starting time of the preparation swing, and the time T2 from the starting time of the preparation swing to the starting time of the batting swing. In the same figure, A shows the starting time of the pitching movement, B shows the starting time of the preparation swing, C shows the starting time of the batting swing, D shows the time when the ball hit the bat, and E shows the time when the ball reaches the catcher in the case that batting is not performed. That is, the period from A to E is T0, the period from A to B is T1, and the period from B to C is T2.

Figures 6A, 6B:
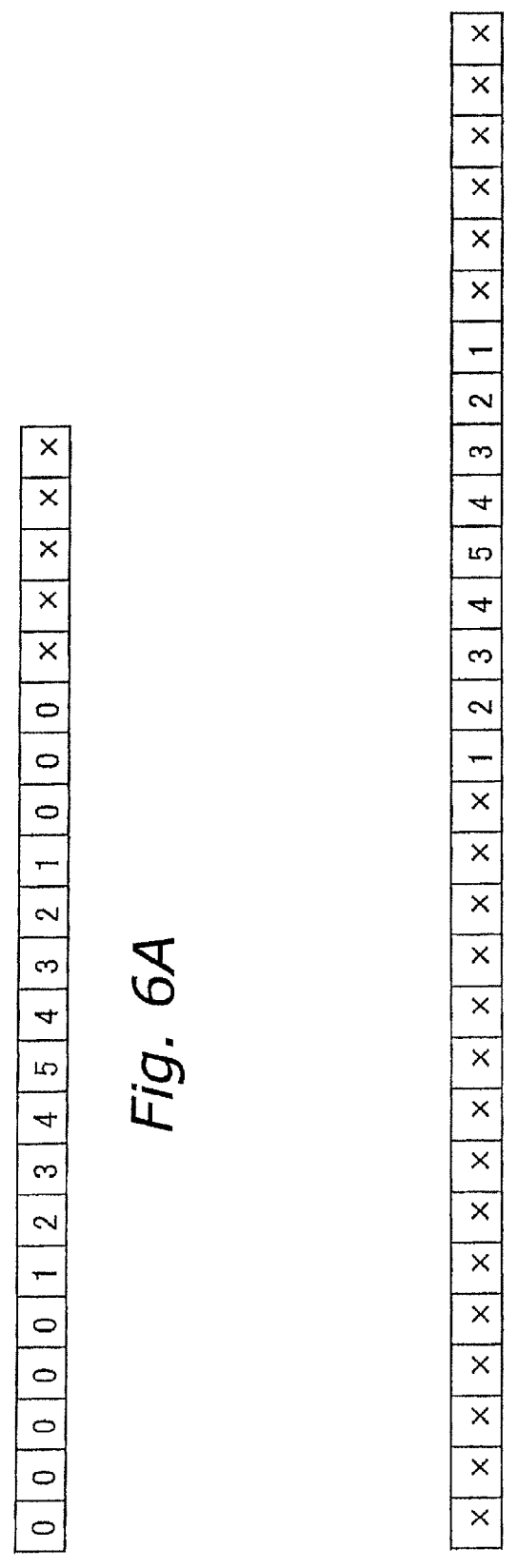

The batting operation evaluation unit 45 reads the operation evaluation table stored in the operation evaluation table memory unit 56, and identifies the evaluation result information with respect to the batting based on T1 and T2. FIG. 6A shows an example of the evaluation table related to T1, and FIG. 6B shows an example of the evaluation table related to T2. In the evaluation tables, an evaluation value is set according to the value of T1 or T2. In the example shown in these figures, the distance from the left end expresses time, and the evaluation is performed by reading out the evaluation value of the position corresponding to the value of the T1 or T2 detected. The respective mass with each of the evaluation values written in has a predetermined identical time interval, and with respect to a movement in a timing that falls in this time interval, an evaluation value of the corresponding mass is assigned. As an example, the time of each mass in the FIGS. 6A and 6B can be 50 msec. In other words, the evaluation value is assigned in every 50 msec.

The evaluation value is set so that the time that is the most favorable timing as the starting timing of the preparation swing and the batting swing (best point: timing of the first passed time) has a highest value. And, the point distribution is set so that points become lower gradually, the farther they are away from the best point. As a result, the following condition can be simulated realistically in a game, in which in a batting according to an actual baseball game, the batting result will be good if the hit is made at the most favorable timing, and the batting result will be poor if it is off from the most favorable timing.

In addition, if the timing of the preparation swing or the batting swing is a timing in which an X is set as an invalid evaluation value to the evaluation value in the evaluation table, the batting of the other swing, that is, regardless of the kind of a timing of the batting swing or the preparation swing, will be a missed swing. This invalid evaluation value is set after a predetermined timing (timing of a second passed time) that is after the timing of the best point, in each of the evaluation tables related to T1 and T2. In addition, in the evaluation table related to T2, it is set also before a predetermined timing that is prior to the timing of the best point, and it may be set in the same way also in the evaluation table that is related to T1. Furthermore, the invalid evaluation value may be set only in one of either T1 or T2.

As a result, for example, if the timing of the preparation swing is extremely poor, the batting swing can be set to be a missed swing even if it is performed at the best point. Consequently, if batting is performed at an awkward timing in which the bat does not hit the ball, for a batting according to an actual baseball game, it is possible to properly make it a missed swing, and the precision of the simulation can be improved.

Based on the above kind of evaluation tables, the batting operation evaluation unit 45 identifies the preparation swing evaluation value (preparation movement evaluation value) corresponding to the preparation swing, and the batting swing evaluation value (real movement evaluation value) corresponding to the batting swing. Then, the batting operation evaluation unit 45 calculates a comprehensive batting evaluation value (operation evaluation value), based on the preparation swing evaluation value and the batting swing evaluation value. The calculating method of the batting evaluation value includes a method of adding the preparation swing evaluation value and the batting swing evaluation value, a method of multiplying the preparation swing evaluation value and the batting swing evaluation value, and the like. In addition, addition or multiplication may be performed after weights that are different from each other are added to each of the preparation swing evaluation value and the batting swing evaluation value. Furthermore, the weights may be realized by differing the evaluation values in the best points set in the evaluation tables, in the preparation swing and the batting swing.

Below, with the evaluation tables shown in FIGS. 6A and 6B, an example of a method of adding the preparation swing evaluation value and the batting swing evaluation value, as a calculating method of the batting evaluation value, is shown.

If both the preparation swing and the batting swing are performed at the best points, the preparation swing evaluation value is 5 and the batting swing evaluation value is 5, and the batting evaluation value is 5+5=10. That is, the batting evaluation value 10 is the highest value.

If the preparation swing evaluation value is 0, and the batting swing evaluation value is 3, the batting evaluation value is 0+3=3. In this case, since the batting evaluation value is 3, with respect to the highest value 10, it is not very good as a batting result.

If the preparation swing evaluation value is 3 and the batting swing evaluation value is X, the batting evaluation value is not calculated, and it becomes a missed swing. That is, the timing of the preparation swing was good to some extent, but since the timing of the batting swing was extremely poor, it became a missed swing.

Like it is described above, since the batting evaluation value is calculated considering both the preparation swing evaluation value and the batting swing evaluation value, it becomes necessary for a player to consider both the starting timing of the preparation swing and the starting timing of the batting swing. That is, the player can make the batting result into a desired state by the control of the period from the preparation swing to the batting swing, and the game can be more entertaining.

Here, on the display screen, in order to determine and assist the player with the starting timing of the batting swing, a timing gauge may be displayed as a batting swing evaluation value presenting image. This timing gauge is an image for making the image change corresponding to the batting swing evaluation value, according to the time passed from the start of the preparation swing. An example of the image change in this timing gauge, according to the batting swing evaluation value that changes according to the time passed, includes a bar graph kind of an image in which the length thereof changes, a circular image in which the length of the radius changes, and the like. By displaying this kind of a timing gauge, it becomes easier for the player to know the timing of when to start the batting swing.

In addition, in the above described example, even though the evaluation tables show the relationship between the time and the evaluation values for each of the T1 and T2, the evaluation tables can be any kind of a table as long as the batting evaluation value is determined according to T1 and T2. For example, an evaluation table may be a table in which the evaluation values are set corresponding to each of the positions on a two dimensional plane with T1 and T2 as the respective two axes. In addition, in the above described example, even though the evaluation values are set discretely in a table format, the evaluation values may be calculated in a functional format in which the evaluation values are determined according to the values of T1 or T2. Furthermore, an evaluation table may be a table in which, instead of the batting evaluation value determined according to T1 and T2, the types of batting results (for example, a single, a home run, a ground ball to the shortstop, a foul, and the like) are determined.

In addition, the evaluation on the batting may be changed according to the batter capability information set as the character setting of the batter that performs the batting. For example, types of capabilities of batters who perform the batting exist, and the evaluation table may be changed according to the type of capability of each batter.

Figures 7A, 7B:
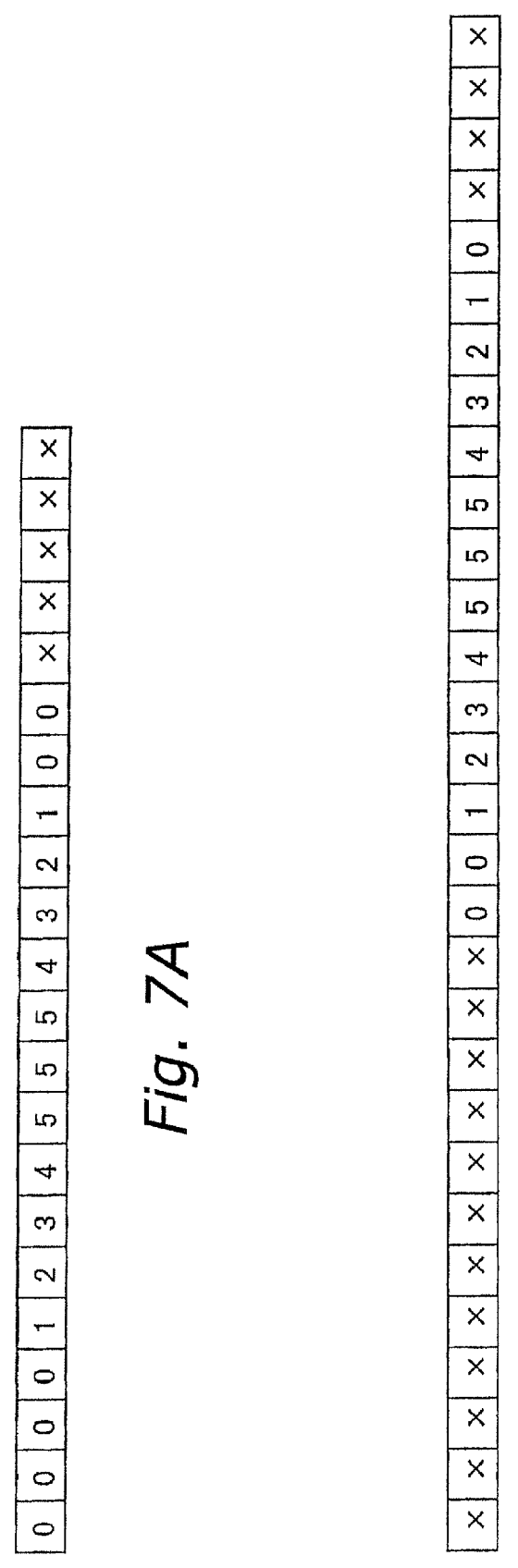

FIGS. 7A and 7B show evaluation tables corresponding to a type of capability of a batter having a higher capability than the type of capability of the batter corresponding to the evaluation tables shown in FIGS. 6A and 6B, and A in the same figure corresponds to the preparation swing while B in the same figure corresponds to the batting swing. In the evaluation tables shown in FIGS. 6A and 6B, even though each of the best points is in one place, in the evaluation tables shown in FIGS. 7A and 7B, the best points are each in three places, and the period of the best points becomes longer. In addition, along with the expansion of the best points, the periods in which the evaluation values are 1 or above also become longer. That is, the batting result is more likely to be better using the evaluation tables shown in FIGS. 7A and 7B than if the evaluation tables shown in FIGS. 6A and 6B are used.

In other words, evaluation tables corresponding to the type of capability of each of the batters are stored in the operation evaluation table memory unit 56, with the types of capabilities of the batters stored as the batter capability information of each of the players that appears in the game in the batter capability information memory unit 54. Then, the batting operation evaluation unit 45 can read the type of capability corresponding to the batter that performs the batting from the batter capability information memory unit 54, and evaluate the batting according to the evaluation tables corresponding to the type of capability. Possible methods for setting the types of capabilities of batters are, for example, a type of method of setting the comprehensive batting capability in stages, a type of method in which, depending on the tendency of the batting, for example, the ability to hit a long ball is high but the rate of a safe hit is low, the ability to hit a long ball is low but the rate of a safe hit is high, and the like, types are divided into types like the long ball type, safe hit type. In addition, as the batter capability information, information related to the health of the batters may also be included, and the evaluation tables may be changed according to the health condition.

Furthermore, evaluation tables may be set for each individual batter player. In this case, the timing setting of the preparation swing evaluation value and the batting swing evaluation value can be done considering the batting habits and the like of each player. Consequently, for example, by combining this with the image display performed corresponding to each of the players, it is possible to produce a preparation swing and a batting swing according to the habits and the like of the batting form of each of the players, and the game can be more entertaining.

In addition, information on the compatibility of each of the batter players with each of the pitcher players may be set as the batter capability information. In this case, since the batting result changes according to the compatibility between the batter and the pitcher, a player will be able to further enjoy strategic tactics and the like.

In this manner, if the evaluation tables change according to the types of capabilities of the batters, the tendency of the batting result can be changed according to the character setting of the batters. Consequently, like an actual baseball game, since the batting result changes according to the capability of each player, the reality of the simulation of the baseball game can be improved.

Furthermore, in the above described example, evaluation is performed according to the type of capability of each batter, by storing evaluation tables corresponding to the type of capability of each batter in the operation evaluation table memory unit 56. However, the evaluation tables may be in one type, and the batting operation evaluation unit 45 may perform evaluation by multiplying the evaluation values set in the evaluation tables according to the type of capability of each batter by a coefficient. For example, a process such as multiplying each evaluation value by 1.5 if the batting capacity is high, and multiplying each evaluation value by 0.5 if the batting capability is low can be performed.

In addition, evaluation on the batting may be changed according to the pitcher capability information set as the character setting of the pitcher that performs pitching. For example, the types of capabilities of the pitchers performing pitching may be set plurally, and the evaluation table may be changed according to the type of capability of each pitcher.

That is, evaluation tables corresponding to the type of capability of each pitcher is stored in the operation evaluation table memory unit 56 with the types of capabilities of the pitchers stored as pitcher capability information of each of the players that appears in the game in the pitcher capability information memory unit 55. Then, the batting operation evaluation unit 45 can read the type of capability corresponding to the pitcher performing pitching from the pitcher capability information memory unit 55, and evaluate the batting according to the evaluation table corresponding to the type of capability. Possible methods for setting the types of capabilities of pitchers are, for example, a type of method of setting the comprehensive pitching capability in stages, a type of method in which, depending on the tendency of the pitching, for example, straight pitch is fast, good at a breaking ball, and the like, types are divided. In addition, as the pitcher capability information, information related to the health of the pitchers may also be included, and the evaluation tables may be changed according to the health condition.

In this manner, if the evaluation tables change according to the types of capabilities of the pitchers, the tendency of the batting result can be changed according to the character setting of the pitchers. Consequently, like an actual baseball game, since the batting result changes according to the capability of each player, the reality of the simulation of the baseball game can be improved.

In addition, in the above described example, evaluation is performed according to the type of capability of each pitcher, by storing evaluation tables corresponding to the type of capability of each pitcher in the operation evaluation table memory unit 56. However, the evaluation tables may be in one type, and the batting operation evaluation unit 45 may perform evaluation by multiplying the evaluation values set in the evaluation tables according to the type of capability of each pitcher by a coefficient. For example, a process such as multiplying each evaluation value by 0.5 if the pitching capacity is high, and multiplying each evaluation value by 1.5 if the pitching capability is low can be performed.

In addition, the evaluation on the batting may be changed according to the pitching contents with respect to the batting, that is, the moving state of the ball. For example, evaluation tables may be changed according to the pitching contents. Pitching contents include the moving speed and the movement pathway of the ball, and the like. The movement pathway includes the position of the ball when passing the home base (inside low, high and outside, and the like), and the type of breaking ball (curve, shoot, fork, and the like), and so forth.

More specifically, first, the ball movement control unit 43B determines the moving state of the ball, for example, the speed of the ball and the movement pathway, according to the pitching contents of the pitcher by the pitcher movement control unit 44B. The information of this moving state of the ball is stored in the batting operation state memory unit 57. On the other hand, the evaluation table corresponding to the moving state of the ball is stored in the operation evaluation table memory unit 56. And, the batting operation evaluation unit 45 can read out the information of the moving state of the ball from the batting operation state memory unit 57, and evaluate the batting according to the evaluation table corresponding to the moving state of the ball.

In this manner, if the evaluation tables are changed according to the moving state of the ball, the tendency of the batting result can be changed according to the pitching contents. Consequently, like an actual baseball game, since the batting result changes according to the pitching contents, the reality of the simulation of the baseball game can be improved.

In addition, it is also possible to consider it in the following way. For T1, the best point can possibly change depending on the moving state of the ball, especially the speed of the ball pitched, but for T2, purely the timing of the swing of the batting affects the batting result, without being affected by the speed of the ball. In this case, only the evaluation table related to T1 may be changed according to the moving state of the ball.

In the description above, examples of the evaluation on the batting changed according to the batter capability information, the pitcher capability information, and the pitching contents were shown, but the evaluation on the batting may be changed considering all of them. In this case, the above described method considering the batter capability information, the method considering the pitcher capability information, and the method considering the pitching contents can be combined appropriately. That is, the evaluation of the batting may be changed according to at least one of any of the batter capability information, the pitcher capability information, and the pitching contents.

The Switching of the Batting Methods

In the above described example, the preparation swing is started by a player pressing the batting button in the beginning after the start of the pitching, and the batting swing is started by the batting button being pressed again thereafter. Here, after the preparation swing is started, if an operation button, which is different from the batting button, is pressed by the player, a batting method different from the normal batting swing may be performed. That is, the batter movement control unit 42B may change the type of batting method performed by the batter, according to the type of operation information determined as the second operation information by the operation determination unit 31.

For example, a bunt button as the button for inputting an instruction of a bunt movement is set in the controller 2, and if this bunt button is pressed after the start of the preparation swing, the batter movement control unit 42B controls the movement so that the batter bunts. In addition, operation information for instructing a checked swing so that the bat is swung lightly to hit the ball, and the like, may be used.

If this kind of a switching of the batting methods is performed, since the player can change the type of batting method according to the situation after the start of the preparation movement, a highly real-time, and a wide variety of operational options can be provided.

If the above described kind of a switching of the batting methods is performed, the evaluation on the batting may be changed according to the batting method. For example, a plurality of the types of batting methods may be set, and the evaluation table may be changed according to the type of each of the batting methods.

That is, evaluation tables corresponding to the types of batting methods are stored in the operation evaluation table memory unit 56. The batting operation evaluation unit 45 can obtain the type of batting method from the batter movement control unit 42B, and evaluate the batting according to the evaluation table corresponding to the type of batting method.

In this manner, if the evaluation tables are changed according to the types of batting methods, the tendency of the batting results can be changed according to the batting method instructed, and the simulation of the baseball game can be more realistic.

In addition, in the above described example, when the operation information showing that the batting button is pressed after the pitching movement is started is received, the operation determination unit 31 determines the operation information as the input of the first operation information that shows the starting instruction of the preparation swing, and when the operation information showing that another above described batting button is pressed is received after the input of the first operation information, the operation determination unit 31 determines the operation information as the input of the second operation information showing the starting instruction of the batting swing.

In this case, the player can perform the starting instruction of the preparation swing and the starting instruction of the batting swing by pressing the same operation button twice, without performing an operation that is not straightforward, such as having to move a finger to a different button.

In addition, since the operation of pressing down the operation button is a movement in which, for the player, the timing can be easily grasped, the starting instruction of the preparation swing and the batting swing can be performed precisely at a timing that is intended by the player.

In addition, the operation information determined as the input of the first operation information and the operation information determined as the input of the second operation information may be different. That is, the button for performing the starting instruction of the preparation swing and the button for performing the starting instruction of the batting swing may be different buttons.

Other Batting Operations

In the description above, regarding the batting operation by the player, the input of the starting timing of the preparation swing and the input of the starting timing of the batting swing were described, but other than these, other batting operations may be performed. Examples of batting operations applicable in this embodiment include zone hit, area hit, normal, lock on, and the like.

Zone hit is a batting operation method for changing the batted ball direction, which is the moving direction of the ball by the batting, according to the direction shown in the direction instruction operation information, in the case that an input of the direction instruction operation information that shows the direction instruction is detected by the operation determination unit 31, at the timing at which the input for instructing the start of the batting swing is detected.

The direction instruction operation information is provided in the controller 2, for instance, and can be created by the player operating a lever or a button, that can indicate a direction. Here, the moving amount of the direction may be a fixed amount, or may change according to the operated amount of the direction indication. The operated amount of the direction indication may, for example, be determined by the tilted amount of the lever provided in the controller 2, or may be determined by the amount of time the button provided in the controller 2 is pressed.

Figure 8A:
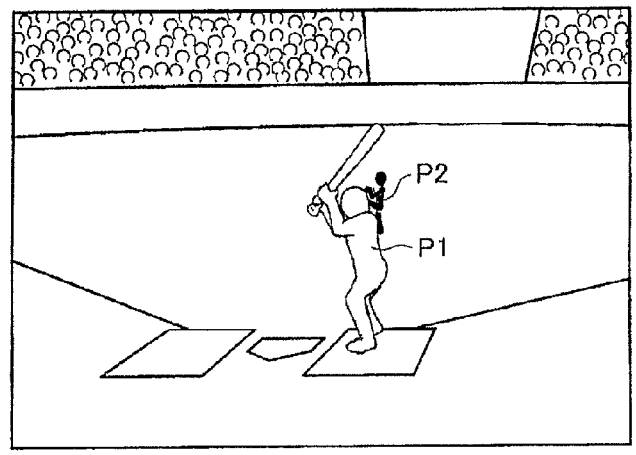
FIGS. 8A to 8C show an example of the display screen changed according to a direction instruction operation information, in the case that a zone hit is performed.
Figure 8B:
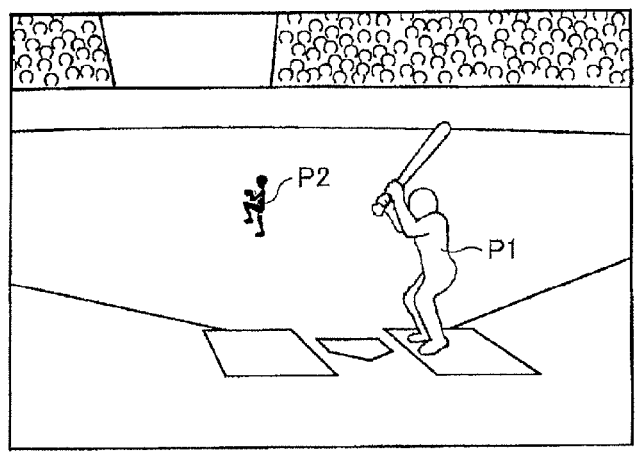
Figure 8C:
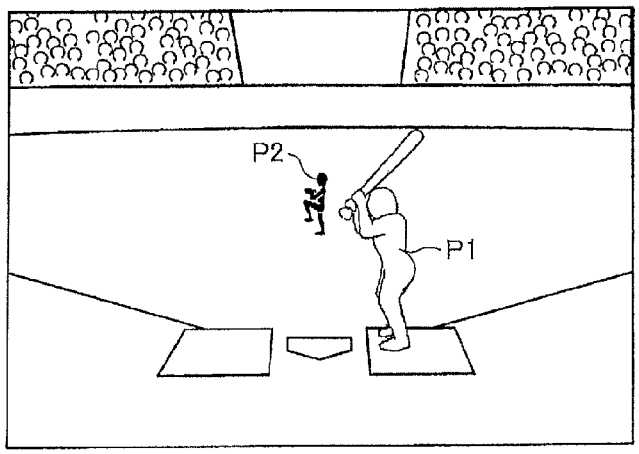

FIGS. 8A to 8C show examples of the image display changed according to the direction instruction operation information, with FIG. 8A showing the case when the direction instruction operation information that shows the left direction is inputted, FIG. 8B showing the case when the direction instruction operation information that shows the right direction is inputted, and FIG. 8C showing the case when the direction instruction operation information is not inputted. First, as shown in FIG. 8C, when the direction instruction operation information is not inputted, the batted ball direction is in the front direction, in other words, in the center direction viewed from the home base, and the image display is also in the state in which the front direction becomes the front side. On the other hand, when the direction instruction operation information showing the left direction is inputted, as shown in FIG. 8A, the batted ball direction is in a direction to the left from the front direction (right direction), and the image display is also in the state in which the direction to the left from the front direction becomes the front side. In addition, when the direction instruction operation information showing the right direction is inputted, as shown in FIG. 8B, the batted ball direction is a direction to the right from the front direction (left direction), and the image display is also in the state in which the direction to the right from the front direction becomes the front side.

In addition, it may be configured that when the direction instruction information showing the downward direction (or the upward direction) is inputted, the batted ball flies upwards, and when the direction instruction information showing the upward direction (or downward direction) is inputted, the batted ball flies low.

According to the above described kind of a zone hit, the player can change the moving direction of the ball by batting, by performing the operation that shows the direction indication, at the timing of the starting instruction of the batting swing. Consequently, since the movement of the ball by the batting can be controlled more in detail, the entertaining degree of the operations can be improved.

In addition, it is easy to perform the operation for instructing the moving direction of the ball by the batting in parallel with the operation for performing the operation for starting the preparation swing and the operation for starting the batting swing continuously, since it is an operation input that is comparatively simple. That is, the player is not forced to any complicated operations, and the operational feeling of a highly entertaining game can be provided.

The above described "area hit" is a batting operation method for specifying a region roughly, as the landing spot of the ball after batting. In the case that the input of direction instruction operation information showing a direction indication is detected by the operation determination unit 31, the region is determined according to the direction shown in the direction instruction operation information.

On the other hand, the above described "normal" is a batting operation method for performing batting by moving the batting cursor for specifying the position of the bat at the time of swinging the bat. If an input of the direction instruction operation information showing a direction indication is detected by the operation determination unit 31, the batting cursor moves according to the direction shown by the direction instruction operation information. That is, in this case, the player moves the batting cursor to the position where the ball being pitched will pass the home base, to perform batting.

In the case of this kind of a batting operation method, in addition to the control of the preparation swing timing and the batting swing timing, since the position at which the bat will be swung is also controlled, for the simulation of the batting movement, a more realistic operational feeling can be provided. On the other hand, the control of the position of the batting cursor is extremely difficult taking into consideration the speed of the ball from the pitch, and possibly the game can become too difficult.

With respect to this problem, possibly the size of the batting cursor can be set to a bigger size than normal. In this case, a player who feels that it is hard to operate with a normal size batting cursor can make the level of difficulty of the game easier by switching to a setting in which the size of the batting cursor is bigger.

In addition, the above described "lock on" is a batting operation method for performing batting by moving the batting cursor, which is the same as "normal" in this respect, but also for automatically correcting the batting cursor with respect to the passing position of the ball. Also in this case, the level of difficulty of the movement operation of the batting cursor can be made easier.

Application Examples Other than for Baseball Games

In the above described embodiment, the present invention was described using an example of a baseball game as the game provided by the game system 10, but the present invention, not limited to baseball games, can be applied to the following kinds of games. That is, the present invention is applicable to a kind of a game in which the operation object being the object that a player manipulates, and the mobile object with the moving state thereof changed according to the movement of the operation object exist, and after a predetermined moving movement of the mobile object is started, a preparation movement of a movement with respect to the mobile object by the operation object according to the operation input by the player is started, and furthermore, the real movement with respect to the mobile object by the operation object according to the operation input by the player is started.

Examples of this kind of games include ball games of sports games, such as tennis games, soccer games, volleyball games, and the like, and weapon combat type of games in which knives or other weapons are used to fight.

In a ball game of a sports game, the operation object can possibly correspond to a specific player that the player operates, and the mobile object can possibly correspond to the ball used in the sports ball game. As an example, in the case of assuming that the game is a tennis game, the preparation movement corresponds to the take back of the racket, and the real movement corresponds to the forward swing.

In a weapon combat type of a game, the operation object can possibly correspond to a specific character that the player operates, and the mobile object can possibly correspond to the opponent character. In this case, the preparation movement corresponds to the raising movement of the knife, and the real movement corresponds to the swinging down movement thereof. In addition, changes of the moving state of the mobile object by the real movement can possibly correspond to the degree of damage caused to the opponent character.

The present invention is not limited to the embodiment described above, and various changes can be made within the scope shown in the claims. That is, an embodiment that can be obtained by combining technical unit arbitrarily altered within the scope shown in the claims is also included in the technical scope of the present invention. The game apparatus according to the present invention is applicable for a variety of games in which an operation object being the object that the player operates, and a mobile object with the moving state thereof changed according to the movement of the operation object exist, and after a predetermined moving movement of the mobile object is started, a preparation movement of a movement with respect to the mobile object by the operation object according to an operation input by the player is started, and furthermore, the real movement with respect to the mobile object by the operation object according to the operation input by the player is started.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer readable medium storing a computer program for a video game in which an operation object is operated by a player via an operation input device, the computer program comprising:
    code for controlling displaying the operation object;
    code for controlling displaying a mobile object;
    code for confirming first operation information by a first input and second operation information by a second input sent from the operation input device;
    code for controlling the operation object to start a first movement when the first input is detected by the operation determination unit, after the mobile object starts moving;
    code for controlling the operation object to start a second movement when the second input is detected by the operation determination unit;
    code for controlling the moving state of the mobile object corresponding to movement of the operation object on the basis of length of a first period from when the mobile object starts moving to when the operation object starts the first movement, and length of a second period from when the operation object starts the first movement to when the operation object starts the second movement;
    code for generating evaluation result information corresponding to the player's operation, on the basis of the length of the first period, the length of the second period, and an evaluation corresponding to the length of the first period and the length of the second period,
    code for determining the moving state of the mobile object on the basis of the evaluation result information;
    code for storing evaluation standard information showing relationship among the length of the first period, the length of the second period, and an evaluation corresponding to the length of the first period and the length of the second period;
    code for storing first capability information of the operation object; and
    code for changing the evaluation result information on the basis of the first capability information.

2. The non-transitory computer readable medium according to claim 1, wherein
    the evaluation standard information includes a preparation movement evaluation standard information and a real movement evaluation standard information,
    the preparation movement evaluation standard information shows relationship between a preparation movement evaluation value and the length of the first period,
    the real movement evaluation standard information shows relationship between a real movement evaluation value and the length of the second period,
    the code for changing the evaluation result information on the basis of the first capability information includes code for determining the preparation movement evaluation value and the real movement evaluation value on the basis of the evaluation standard information, and code for calculating an operation evaluation value on the basis of the preparation movement evaluation value and the real movement evaluation value, and
    the code for controlling displaying the mobile object includes determining the moving state of the mobile object on the basis of the operation evaluation value.

3. The non-transitory computer readable medium according to claim 2, wherein
    at least either one of the preparation movement evaluation value and the real movement evaluation value is selected from a plurality of evaluation values predetermined for each period of time elapsed from beginning of the first period or beginning of the second period.

4. The non-transitory computer readable medium according to claim 3, wherein
    at least any one of evaluation value among the evaluation values is set to be the highest at a first elapsed time, which is predetermined, from beginning of the first period or from beginning of the second period, and
    the evaluation values decrease as time elapses from the first elapsed time.

5. The non-transitory computer readable medium according to claims 2, wherein
    the operation evaluation value is generated by adding the preparation movement evaluation value and the real movement evaluation value.

6. The non-transitory computer readable medium according to claim 2, wherein
    at least any one of evaluation value among the evaluation values is set to be invalid on or after a second elapsed time which is after the first elapsed time and predetermined, and
    the operation evaluation value is set to be the lowest, if at least either one of the preparation movement evaluation value and the real movement evaluation value is invalid.

7. The non-transitory computer readable medium according to claim 1, wherein
    the code for controlling displaying the mobile object includes code for changing the moving state of the mobile object anytime after the mobile object starts moving, and
    the code for generating the evaluation result information includes code for changing the evaluation result information on the basis of the moving state of the mobile object.

8. The non-transitory computer readable medium according to claim 1, further comprising
    code for controlling displaying a movement object from which the mobile object starts moving, and
    code for storing second capability information of the movement object, wherein
    the code for generating the evaluation result information includes changing the evaluation result information on the basis of the second capability information.

9. The non-transitory computer readable medium according to claim 1, wherein
    the code for controlling displaying the operation object includes changing moving state of the operation object on the basis of the second operation information, and
    the code for generating the evaluation result information includes changing the evaluation result information on the basis of the moving state of the operation object.

10. The non-transitory computer readable medium apparatus according to claim 1, wherein
    after the mobile object starts moving, the first operation information is confirmed when the first input is detected, and
    after the first operation information is confirmed, the second operation information is confirmed when the second input is detected.

11. A method for controlling a video game in which an operation object is operated by a player via an operation input device, the method comprising:
    controlling displaying the operation object;
    controlling displaying a mobile object;
    confirming first operation information by a first input and second operation information by a second input sent from the operation input device;

controlling the operation object to start a first movement when the first input is detected by the operation determination unit, after the mobile object starts moving;

controlling the operation object to start a second movement when the second input is detected by the operation determination unit;

controlling the moving state of the mobile object corresponding to movement of the operation object on the basis of length of a first period from when the mobile object starts moving to when the operation object starts the first movement, and length of a second period from when the operation object starts the first movement to when the operation object starts the second movement;

generating evaluation result information corresponding to a player's operation, on the basis of the length of the first period, the length of the second period, and an evaluation corresponding to the length of the first period and the length of the second period, determining the moving state of the mobile object on the basis of the evaluation result information;

storing evolution standard information showing relationship among the length of the first period, the length of the second period, and an evaluation corresponding to the length of the first period and the length of the second period;

storing first capability information of the operation object; and changing the evaluation result information on the basis of the first capability information.

* * * * *